W. SWANK.
CAMERA.
APPLICATION FILED MAY 20, 1914.

1,133,891.   Patented Mar. 30, 1915.

Witnesses
Tommy L. Groff
B. C. McCormick

Inventor
William Swank
By N. E. Gee
his Attorney

UNITED STATES PATENT OFFICE.

WILLIAM SWANK, OF ALTOONA, PENNSYLVANIA.

CAMERA.

1,133,891.  Specification of Letters Patent.  Patented Mar. 30, 1915.

Application filed May 20, 1914. Serial No. 839,771.

*To all whom it may concern:*

Be it known that I, WILLIAM SWANK, a citizen of the United States, residing at Altoona, in the county of Blair and State of Pennsylvania, have invented certain new and useful Improvements in Cameras, of which the following is a specification.

This invention relates to cameras and has for its specific object improved means for operating the shutter, such that the timing feature can be so adjusted and set as to operate the shutter at any desired predetermined instant, which is a feature highly appreciated by the amateur photographer.

Another object of this invention is to provide a shutter operating device that is simple in its construction and at the same time possessing features that make it readily applicable to existing cameras.

A still further object of this device is to provide a timing shutter operating mechanism that is readily adjustable to a wide range of time, thus permitting the photographer to pose for his own picture without risk of a ruined plate or film by virtue of camera movements which are common with most shutter operating mechanisms.

With these and many other objects in view, which will more readily appear as the nature of the invention is better understood, the same consists in the novel construction, combination and arrangement of parts as will be hereinafter more fully described, illustrated and claimed.

It will be readily understood that this invention is quite susceptible to a wide range of structural modification without departing from the spirit or scope of the invention, but a preferred and practical embodiment of the invention is shown in the accompanying drawings in which—

Figure 2:
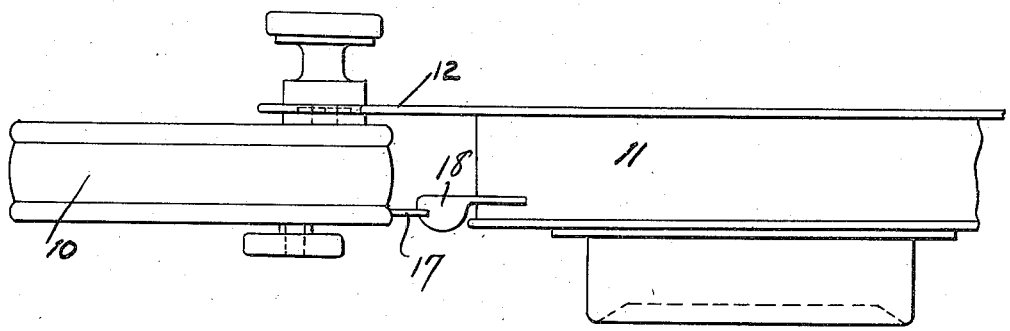
Figure 1:
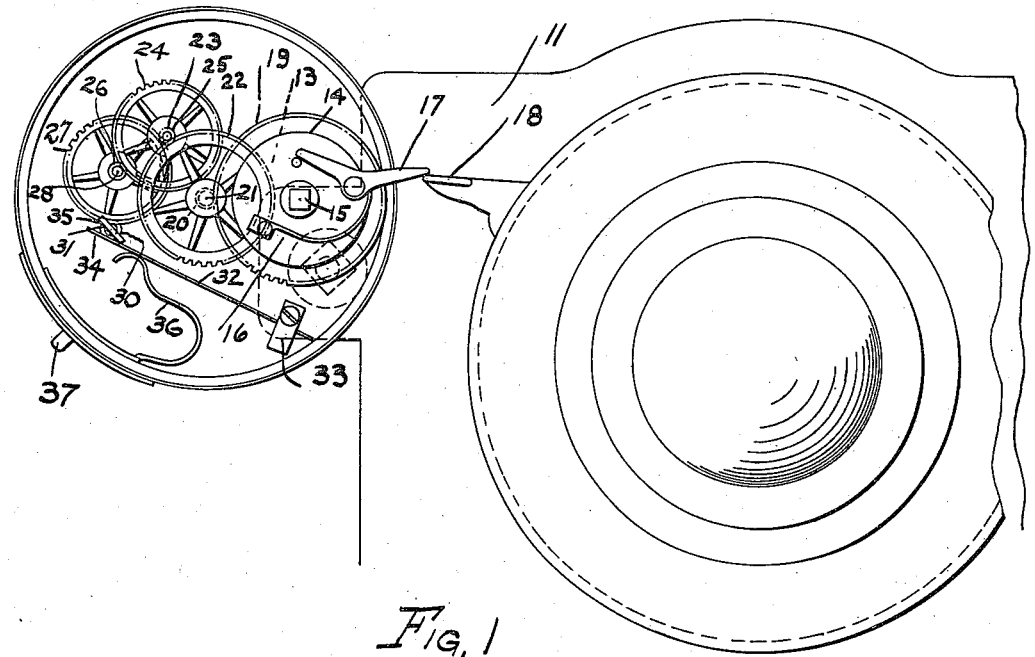

Figure 1 shows the present invention in operative position on a camera and fully illustrates the manner in which the shutter tappet is moved by the timing mechanism tappet. Fig. 2 is a plan view of the parts shown in Fig. 1.

Similar reference numerals indicate similar parts throughout the figures of the drawings.

In carrying out this present invention no change is contemplated in the usual construction of the camera, lens or shutter and to this end I construct a time shutter operating gear designated in its entirety by the numeral 10, which is suitably attached to the camera 11 by means of a timing support bracket 12.

The shutter operating gear, designated by the numeral 10, essentially consists of a power element, a train of gears, means for controlling the speed of the gears, and a timing gear tappet for engaging the shutter tappet. In the construction of this timing gear I provide a main spring 13 positioned within a casing 14, from which protrudes a winding post 15. Attached to the winding post 15, which is rotated by the spring 13, is a disk 16 carrying a pivoted tappet arm 17, which is designed to impinge upon and actuate the shutter tappet 18 of the camera 11.

Suitably secured to the rotating post 15 is a main gear train driver 19, the teeth of which mesh with and rotate the pinion 20, which is positioned on a post 21 and carries as an integral part of the pinion 20, a gear 22. The teeth in the gear 22 mesh with and rotate the pinion 23, which is an integral part of a gear 24, positioned on and rotating around a post 25. The gear 24 likewise meshes with and rotates a pinion 26 which is made integral with a gear 27, rotating upon a common post 28.

The gear 27 meshes with a pinion 30 which carries a brake 31, which is designed to impede the motion of the gear train. Coöperating with the brake 31, is an auxiliary brake 32, which is in the form of a cantaliver fixed at one end as at 33, while the free end 34 is adapted to be pressed against the pinion shaft 35, by the spring 36, which is adapted to have a range of movement concentric with the center of the case for the purpose of applying or releasing the auxiliary brake.

In using a camera to which this invention has been applied, the operation may be described as follows: First the timing tappet 17 revolved away from the shutter tappet 18 and the auxiliary brake 30 is set by moving the peripheral projection 37 upward. The number of degrees that the arm 17 is revolved backward will depend upon the time the operator wishes to give himself before the shutter opens for exposing the negative. The camera is then focused, the projection 37 is pushed down and the train of gears start gradually bringing the arms 17 and 18 together, as shown in Fig. 1 at which time the shutter opens and the negative is exposed.

Without further description and elaboration it is believed that the many advantages of the herein described invention will be readily apparent to those skilled in the art to which it belongs and what I claim as new and desire to be secured by Letters Patent is:—

A shutter operating attachment for cameras, comprising a circular casing, a spring actuated shaft journaled in said casing, a rotatable disk carried by said shaft, a shutter operating trip arm pivotally carried by said disk, a gear train operatively connected to the said spring actuated shaft, a brake for the gear train, an auxiliary brake device including a flat spring element having one end fixed in the casing and its opposite free end in contact with said brake, and a finger controlled spring arranged between said flat spring and the wall of the circular casing, said finger controlled spring shiftable in the casing to vary its tension and move its free end toward and from the free end of said flat spring.

In testimony whereof I affix my signature in presence of two witnesses.

WILLIAM SWANK.

Witnesses:
B. C. McCormick,
N. E. Gee.